Sept. 13, 1949.　　　　　L. E. SODERQUIST　　　　2,482,072
SAFETY MECHANISM FOR VULCANIZERS
Filed April 11, 1946　　　　　　　　　　　　　　　5 Sheets-Sheet 1

INVENTOR
LESLIE E. SODERQUIST
BY
ATTORNEYS

Sept. 13, 1949.    L. E. SODERQUIST    2,482,072
SAFETY MECHANISM FOR VULCANIZERS
Filed April 11, 1946    5 Sheets-Sheet 5

INVENTOR
LESLIE E. SODERQUIST
BY
ATTORNEYS

Patented Sept. 13, 1949

2,482,072

UNITED STATES PATENT OFFICE 2,482,072

SAFETY MECHANISM FOR VULCANIZERS

Leslie E. Soderquist, Akron, Ohio, assignor to The McNeil Machine and Engineering Company, Akron, Ohio, a corporation of Ohio Application April 11, 1946, Serial No. 661,303

18 Claims. (Cl. 18—17)

The present invention relates to a mechanism which may be incorporated in a vulcanizer to render its operation entirely free from certain hazards. This invention is a new and novel adaptation of the principles of the safety mechanism shown and described in my basic Patent No. 2,242,795 issued May 20, 1941. It is also an improvement upon the mechanism shown in my prior Patent No. 2,392,619.

As explained in my prior patents, presses which are used in the vulcanization of pneumatic tires or other articles which are under internal pressure during vulcanization are subject to the hazard of being opened before the internal pressure is reduced to a point where it is safe to open the mold. Modern presses of the type referred to are generally equipped with automatic timing and control devices which release the internal pressure within the article a short interval before the press starts to open. Due, however, to any of several causes, it sometimes happens that the pressure is not relieved or the release of pressure is so slow that when the mold is opened up the residual pressure will burst the article. In the curing of pneumatic tires superheated water is frequently employed, and the bursting of the article creates a serious hazard in the operation of the vulcanizers. In the manufacture of tires the pressure fluid to shape and hold the tire against the mold walls is introduced into a so-called "air bag" which is placed within the tire. The most common cause of retention of the pressure medium within the bag is the clogging of the air bag valve by flakes of rubber which separate from the bag wall and are carried into the valve stem.

Prior to the perfection of the principle covered in my earlier patents it had been proposed to locate a pressure responsive device in the line to the air bag with the expectation that if the pressure within the bag had not been released the mold opening mechanism would not operate. It will be apparent, however, that the pressure might fall in the line at the location of the pressure responsive device, without a corresponding reduction of pressure in the bag if the line were clogged between the responsive device and the bag.

The present invention provides a new and improved means of controlling the opening movement of the press which is directly responsive to the pressure within the article itself.

As in the devices shown in my earlier patents, the system of press control which is shown and described herein does not act to inhibit or prevent the opening of the press, but rather to arrest the opening movement of the press after it has opened to a certain extent but not sufficient to permit the pressure container or air bag to explode.

The drawings and accompanying description show two specific devices by which the invention may be practised, but these are merely embodiments thereof and many of the details are not essential and may be varied or modified without departing from the invention. As the present invention is an improvement upon my prior patents it has not been considered necessary to illustrate the wiring and control devices in detail and reference may be made to those patents for such auxiliary information as may be necessary to enable one skilled in the art to practice the present invention.

The form of press now in general use in the curing of tires, tubes and other rubber or plastic articles is a toggle press in which the upper half or mold section is supported and moved by toggle linkage which is fully straightened out when the press is closed so as to exert a final squeeze which holds the mold sections against the expansive forces within the articles. The upper mold section is generally supported by a platen which during the beginning of the opening movement is moved upward. It will later be swung back out of the way so that the operator may have access to the interior of the mold.

The period of the press operation with which this invention deals is the initial opening movement. During the first part of this movement there is no appreciable raising of the platen for the breaking of the toggle first relieves the strains and stresses which have been put in the press by the straightening of the toggle on final closing. One of the points at which there is relative movement of the press mechanism which is taken up in the final squeeze is the pivotal connection between the toggle link and the shaft by which the platen is carried from the link. This is because in practical machine design it is essential to have a certain clearance between the shaft and the surrounding bearing. The present invention utilizes this necessary looseness between the shaft and bearing to accomplish its purposes. A normal clearance between a shaft and its bearing is about .015 of an inch. If, therefore, the shaft is on the platen and the bearing is in the toggle link, when the press is fully closed there will be a clearance of .015 of an inch between the upperside of the shaft and the adjacent surface of the bearing.

During the first part of the opening movement as the pressure exerted by the toggle is relieved the upper mold section remains in contact with the lower mold section. At the point, however, when the stresses are fully relieved and the toggle link begins to act to lift the platen, the first movement of the toggle link is in taking up the looseness in the bearings between the platen-shaft and the link. No lifting of the platen will take place until the lower surface of the toggle bearing engages the under side of the shaft.

Assuming that the pressure within the tire or other article has been properly released or reduced to a safe degree before the press starts to open, the load will shift to the under side of the toggle link as soon as the stresses are relieved. A point on the toggle link above the shaft bearing will, if operations are normal, follow an arcuate path until the strains are released, then rise in a radial line until the bearing points have shifted and then continue in an arcuate path, elevated somewhat above its initial arcuate path. The extent of radial movement will be equal to the clearance about the bearings.

During the movement of the press after the sudden rise or jump, the platen and its attached upper mold section are suspended or hang from the toggle. Consequently the lowermost portion of the shaft is resting upon the lower side of the bearing.

If, however, the operations are not normal and for some reason the pressure within the article is not released when the toggle starts to break and the downward thrust on the platen and upper mold section is relieved, the expansive force of the pressure medium now reacts to lift the upper mold section and platen so that the shaft follows the movement of the bearing and remains in contact with the upper side of the bearing. The reaction will follow whenever the pressure within the air bag is sufficient to cause an explosion or rupture of the bag for a pressure which is dangerously high will be sufficient to raise the upper mold section and the platen so soon as the downward thrust exerted upon it by the toggle is relieved.

There will therefore be no sudden separation or recession of the platen from the toggle and the net result will be the same as if the point referred to moved in a continuous and unbroken arc.

Summarized briefly, if the operation is proceeding normally there will be a brief lag in the raising of the upper mold section, while if the operation is proceeding abnormally the upper section will be raised immediately and will continue to rise until the bag bursts.

The invention operates upon the principle of placing an arm or feeler for an electric switch, which is either a circuit breaker or actuates a circuit breaker, and a striker in the area between adjacent portions of the toggle link and platen. In the specific form shown herein the switch is on the platen and the striker on the toggle, although it is obvious that this arrangement may be reversed.

The switch arm or feeler and the striker are so located that if operations are proceeding normally the striker will approach the feeler but just before the two come in contact the break or rise occurs and the striker clears the feeler, or, it may be said to "leap frog" the feeler.

If, however, conditions are abnormal, the striker will hit the feeler and the circuit to the press motor will be broken, stopping the press. Even should the pressure within the article later fall to a point where the upper mold section and platen would drop to its normal position the motor will not start up with possible delayed rupture of the bag, but it is necessary for the operator to restore the circuit and this will not be done until it is certain that the press may be opened safely.

It sometimes happens that an unvulcanized tire which is placed in the press is so stiff or heavy that it will support the weight of the upper mold section and platen so that as the press closes, the upper mold section will not rest on the lower mold section toward the end of the closing movement. This may cause the striker and feeler to contact and break the parts. The specific embodiments of the invention here shown prevent such accidents.

The setting of the control mechanism so that it will function properly is a delicate operation requiring an exact setting of the striker and feeler so that the rise in the toggle will occur just before the striker and feeler would come in contact. As this point may be different on presses due to the necessary variations in individual machines, each control device should be set after the press has been installed. The wear of the press parts may cause the critical point to shift. It is, therefore, a further object of the invention to provide a ready means for locating the control mechanism at the correct point.

The following description of the best known and preferred forms of the invention is given in the terms of a press for the vulcanization of pneumatic tires in which, in accordance with the standard practice, the pressure medium is retained in a standard air bag, but it will be understood that the invention is not limited to this particular adaptation and may be employed in all types of operations where an article is treated while under internal pressure in a separable mold.

Also for the purposes of explaining the invention a specific form of toggle press is shown, but it will be appreciated that the application of the invention is in no way limited to presses of the type shown, as any form of press having a platen and a movable member to raise and lower the platen may be equipped with the invention, modified, if need be, from the specific designs illustrated.

In all of the views the clearances have been greatly exaggerated, for if the drawings were to scale the spaces about the shaft and the clearances between the striker and feeler would not be discernible.

Figure 1:
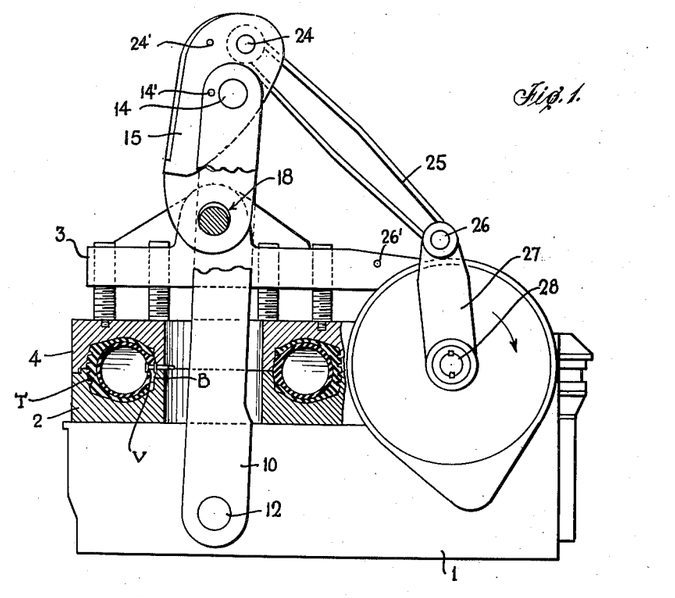
Fig. 1 shows in somewhat diagrammatic form a standard toggle press. The full lines show the press in the act of opening while the operation is normal, i. e., the pressure within the air bag has been released to a point where there is no danger from a full opening of the mold. The instant chosen is at the moment when the toggle is picking up the platen.
Figure 2:
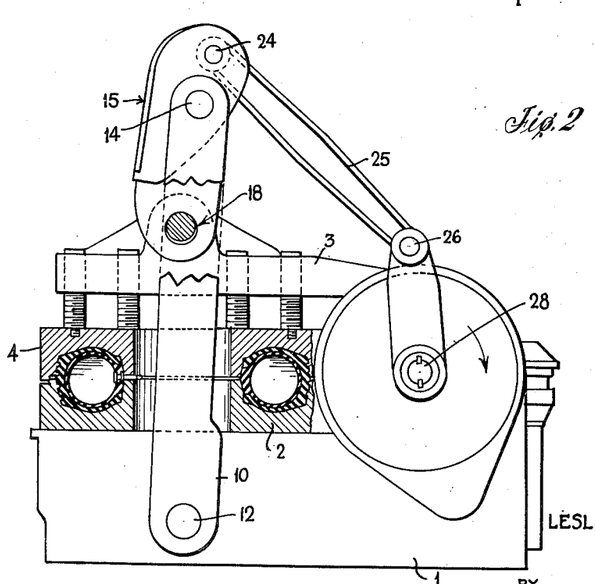
Fig. 2 is a view similar to Fig. 1, but shows the condition of the press when the internal pressure has not been relieved.

In the press which is illustrated in the drawings, the control mechanism shown in Figs. 3 to 8, inclusive is located on the inside surface of the arm 15 and is therefore viewed on the opposite direction from Figs. 1 and 2. Hence, the direction of movement of the arm 15 during the opening of the press is clockwise as shown in Figs. 1 and 2, but is counterclockwise in Figs. 3, 7 and 8.

In Figs. 1 and 2 one side of the toggle press only is shown, it being understood that a similar set of toggle links is on the opposite side of the press. The base of the press is indicated at 1 and the lower mold section, which is secured thereon is shown at 2. A simple form of upper platen is shown at 3 to which the upper mold section 4 is secured. A pneumatic tire is indicated at T and the standard form of air bag at B having a valve stem V through which the pressure fluid is introduced to or evacuated from the bag. The press which has been selected for illustration is of the well known stripping type in which the upper platen and its mold section are moved rearwardly during the opening movement to remove the tire from the mold, but as this operation is not essential to the present invention and as the device shown herein may be adapted to any type of press, the details of the press are shown only to the extent which is necessary for an understanding of the present invention.

The toggle levers and operating means by which the press is opened and closed consist of main toggle arms or levers, one of which is shown at 10, pivoted to the base as at 12. In Figs. 1 and 2 the levers are broken away to show the mechanism more clearly. These levers extend upwardly on either side of the base and at 14 there is pivotally mounted to the levers 10 the upper toggle lever 15 which extends across the press. Arms 16 which span the top platen extend downwardly from the lever 15 and are provided with bearings 18 which are preferably in the form of bushings set into the lower ends of the arms. The upper or movable platen 3 is provided with a cross piece or web 20 from which extend the shafts 21 which are received in the bearings 18.

Pivotally connected at 24 to the upper toggle link 15 are connecting links 25, the other ends of which are pivotally connected at 26 to the crank arms 27 mounted for rotation with the main drive shaft 28. This shaft 28 is motor driven, the circuit to the motor being provided with any standard form of circuit breaker which is actuated by the safety switch to be described.

In Figs. 1 and 2 the toggle linkage is shown in the position just as the upper platen is to be picked up by the upper toggle link 15 and in so doing the crank arms 27 have moved in the direction of the arrows approximately 25°. The location of the pivotal centers 14, 24 and 26, when the press is fully closed, are shown by the numerals 14', 24' and 26' on Fig. 1.

As indicated in the introductory portion of the specification the bearings 18 and 21 between the upper toggle link and the upper platen necessarily provide a certain amount of clearance which, in a press of this type, is usually in the neighborhood of .015 of an inch.

Between the shaft and the upper toggle bearing there is mounted within one of the spaces at the angle between the main toggle 15 and its depending arm 16, a safety control switch box or housing which is indicated generally at 30. A pad 31 is formed or attached to the web 20 to which the switch box is secured by bolts 33. The upper side of the box is on an arc which will avoid interference with the striker in its movement above the box. The box is open on its outer face and a cover plate 32 is removably secured thereon.

The striker which is one element of the switch actuating couple is indicated at 34. This is preferably in the form of a hardened steel pin or block, the forward lower edge of which is ground to a knife edge. The striker 34 is press fitted into the outer end of striker operating plate 35. This plate is sector-shaped, the inner or larger portion of which is cut out to provide a circular bearing surface which fits around the shaft 21. As shown in the drawings, a convenient method of mounting the plate 35 so that it is concentric with the bearing 18 is to provide the bearing with a flange 36 which fits the circular opening in the plate. The plate is secured to the arm 16 by means of the clamping bolts 38, the shanks of which pass through arcuate slots 40 cut in the plate 35. Compression springs 41 and washers 42 are located between the heads of the bolts and the face of the plate 35.

When the bolts 38 are fully turned down the plate 35 will be rigidly held in its adjusted position, but on loosening the bolts the plate may be turned within the limits of the slots 40 and will remain in any position. This is the means by which the location of the striker is adjusted, for, as will be explained later, the plate is adjusted angularly by the operator until the point of setting is determined and then the bolts are screwed home, clamping the plate in its final position.

As the plate is secured to the toggle arm, the striker 34 will follow the movement of the arm. The path of the knife edge of the striker is shown by the dotted line S in Figs. 3 and 7. As shown this is an arc until it reaches the point where the stresses in the press are relieved. The point is indicated at P where the edge of the striker will jump in a radially outwardly direction for a distance determined by the extent of movement permitted by the clearance between the shaft 21 and the bearing 18. When this has been taken up, the edge of the striker will continue in an outer extension of the arc S. On the return or closing movement, the striker normally follows the outer arc until the upper mold comes to rest upon the lower mold, and as the toggle straightens out in putting the final squeeze on the mold it will return to the inner arc S.

It is this point P which is the critical point in the press operation, for the feeler which is marked 45 and constitutes the second element of the switch actuating couple, should be set just ahead of the point in order to have the safety device operate most efficiently.

Figures 8, 9:
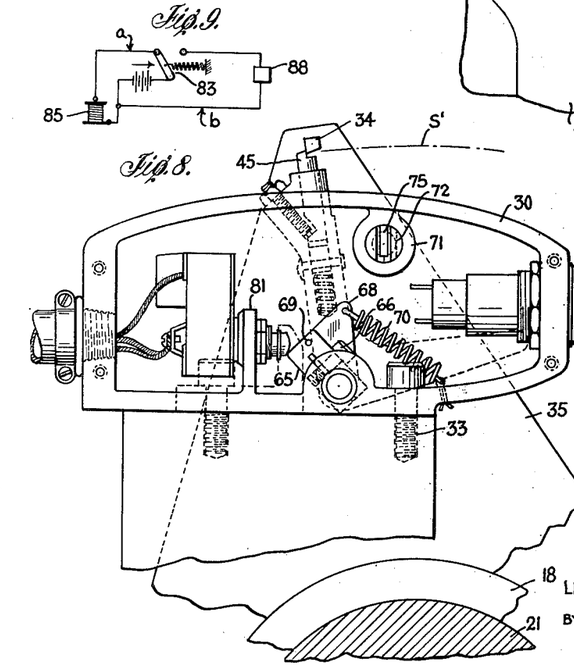
Fig. 8 is a view similar to Fig. 3 but showing the position the control devices assume when the conditions are abnormal and the press has been arrested.
Fig. 9 is a fragmentary view showing the control box wiring.

If, however, conditions are abnormal so that there is no relative movement between the shaft 21 and the bearing 18 there will be no sudden recession of the striker which would permit it to skip the feeler. On the contrary the feeler will remain in the path of the striker and the result will be equivalent to a movement of the striker on the continuous arc S'. The contact of the striker against the feeler will bring the press to an abrupt stop in the position of the parts as shown in Fig. 8.

Figure 3:
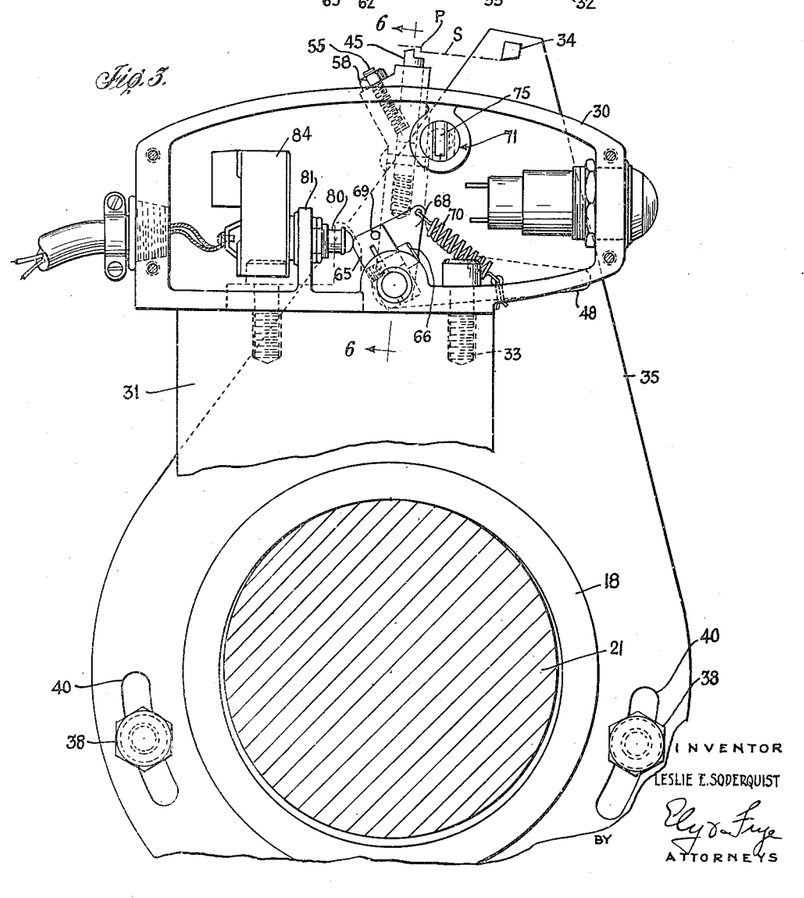
Fig. 3 is a front elevation of the preferred form of safety device, the front cover having been removed. The parts are shown in the relative positions which they occupy when the press is fully closed. This embodiment of the invention also affords an easy and readily operable means for accurate setting of the striker with respect to the feeler. The plane of the view is indicated by the line 3—3 of Fig. 4.
Figure 4:
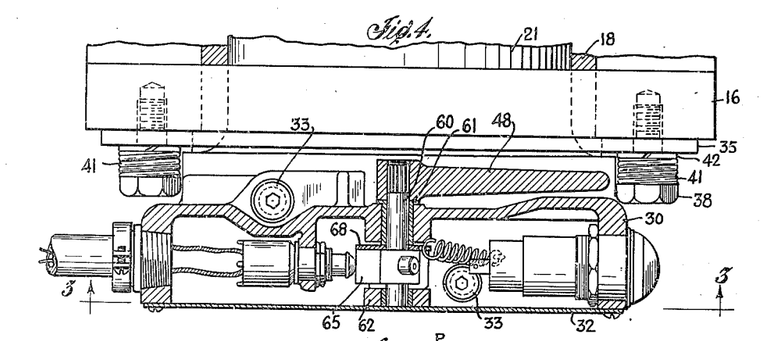
Fig. 4 is a horizontal section through the control box.
Figure 5:
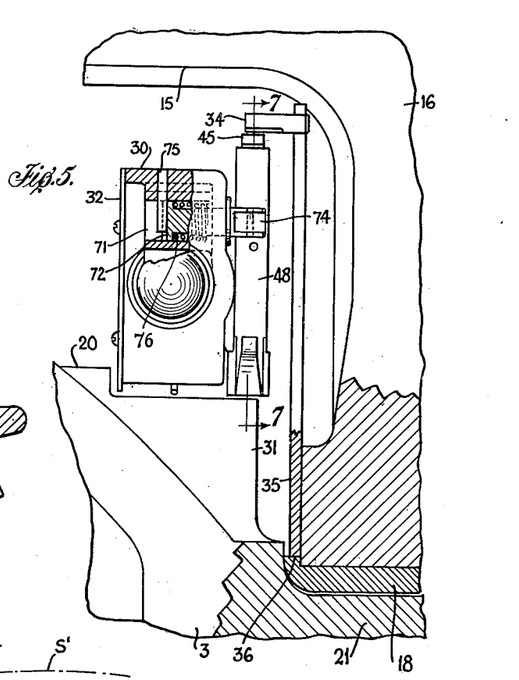
Fig. 5 is a fragmentary side view showing the location of the control box in the space between the toggle arm and the platen support. Part of the housing is broken out in this view to show the mounting of the stop pin. In this view the parts are illustrated in the position they assume when the striker has cleared the feeler.
Figure 6:
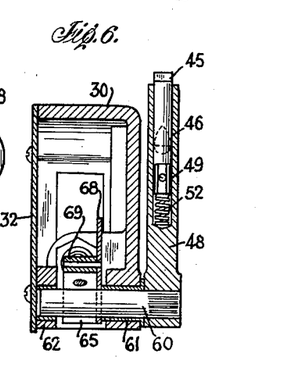
Fig. 6 is a section on the line 6—6 of Fig. 3.

Attention is directed to the showing of the relative position of the bearing 18 and the shaft 21. In Fig. 3 the upper surfaces of the shaft and bearing are in contact for the press at this point is fully closed and the final squeeze has been exerted. In Fig. 5 the operation has proceeded normally and the striker has cleared the feeler, therefore, the undersides of the shaft and bearing are in contact and the clearance appears at the top of the bearing. However, in Fig. 8 the upper sides of the shaft and bearing remain in contact throughout the limited press movement. The conditions of Figs. 5 and 8 are also illustrated in Figs. 1 and 2, respectively.

Referring to the details of the switch box, it will be borne in mind that these are not essential for it is conceivable that other designs may be adopted to perform the same functions.

The feeler 45 is an elongated pin or plunger, the upper end of which is cut away to present an abrupt knife edge which is opposed to the knife edge on the striker 34. The pin is slidably fitted in a barrel or socket formed in the vertical arm of a pivoted angular lever arm which is indicated, as a whole, by the numeral 48. The lower end of the pin is divided to provide the two extensions 49. At this point a transverse guide pin 50 is riveted in the barrel which lies between the extensions 49 and keeps the pin from turning in the socket. A coil spring 52 between the lower end of the pin and the base of the socket urges the pin outward.

To provide for adjusting the knife edge of the feeler at its correct height so that it will protrude sufficiently to be struck by the element 34, an angular shoulder 54 is cut in the side of the pin. Through the pressure exerted by the spring 52 this surface bears against the lower end of a set screw 55 threaded in an angular socket formed in an extension 56 on the side of the arm 48. A lock-nut 58 is threaded on the outer end of 55.

Assuming the normal clearance of .015 of an inch between the shaft 21 and its bearing 18, the knife edge of the pin 45 may be set .005 of an inch above the low part of the arc, which will give sufficient area of contact with the striker to actuate the safety switch and allows .010 of an inch clearance between the knife edges 34 and 45 which is ample for the two elements to clear when conditions are normal.

The angular arm 48 is press fitted over the knurled end of a shaft 60 which is received in a sleeve 61 set in the base of the housing 30. The outer end of this shaft is received in a bearing 62 attached to the rear face of the cover plate 32.

Mounted on the shaft 60 within the housing is a split clamping arm 65 held in fixed position on the shaft by the bolt 66. At the rear side of the arm 65 is a substantially triangular plate 68 which fits over the shaft 60 and is fixed to the arm 65 by a pin 69. A coil spring 70 is attached to the plate 68 and to the housing and serves to urge the entire assembly carried by the arm 48 to the right.

On the upright rear wall of the housing is formed the circular socket 71 in which is slidably mounted a stop pin indicated by the numeral 72. The head of this pin fits loosely in the socket and the stem or rear end of the pin projects through the rear wall of the housing and into the path of the vertical portion of the arm 48. It will be noted that the rear extremity of the pin is provided with a flattened area indicated by the numeral 74 in Figs. 5 and 7. While the press is in operation, the rounded surface of the pin is presented to the arm 48 but for the purpose of setting the feeler 45 the pin is turned so that the flattened surface is presented to the arm 48. In all of the views except Fig. 7 the pin is set in its working position.

The head of the pin 72 is formed with a V-slot and in the top of the housing and projecting across the socket 71 is a pin 75. A coil spring 76 is located between the head of the pin and the base of the socket, this arrangement holding the pin against turning when set in either position but permitting it to be turned to present either its rounded or flattened side to the lever 48. The extent to which the radius of the pin is reduced by the cut away 74 is equivalent to the distance to which the knife edge of the feeler 45 is set ahead of the critical point P. This is shown in Fig. 3 and also by a comparison of the full line and dotted line showings of the end of the pin 45 in Fig. 7.

The upper corner of the clamp 65 is rounded as shown in Figs. 3 and 8 and when operations are normal this surface is in contact with a spring loaded push button 80 adjustably mounted in a bracket 81 rising from the floor of the housing 30. When the parts are as shown in Fig. 3 the electrical circuit to the circuit breaker is closed at a switch 83 (see Fig. 9) located in casing 84 carried by the bracket 81. When the switch is in the full line position of Fig. 9 which corresponds to the position of the parts in Fig. 3 the circuit to the solenoid 85 which controls a spring loaded circuit breaker (not shown) is closed. When, however, the arm 48 is rocked to the left, as shown in Fig. 8 the switch 83 is moved to break the circuit $a$ to the solenoid 85 and to close a second circuit $b$ to a lamp 88 mounted on the front of the housing. This stops the press and turns on the light so that a visual signal is provided.

It will be noted that should the mold fail to close properly when the press is reversed due to the causes recited at the opening of the specification so that the striker 34 hits the pin 45 the two members will engage by their beveled surfaces and as the arm 48 cannot move to the right because of the stop pin 72, the pin 45 will merely depress against the spring 52 and the press continues uninterruptedly on its closing movement without breakage.

The method will now be described for setting the device so that the member 34 will approach as closely as practicable to the member 45 before the stresses are relieved and the rise indicated by the point P occurs. Assume the press to be fully closed and the cover 32 removed.

Figure 7:
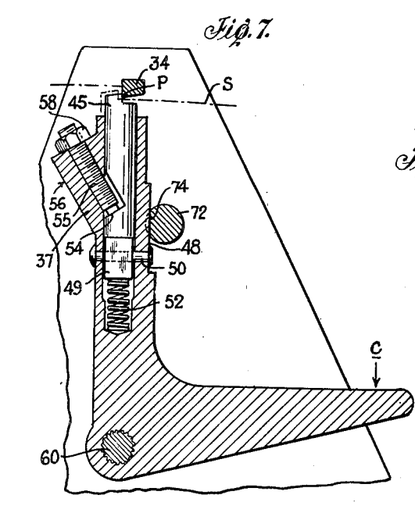
Fig. 7 is a section on the line 7—7 of Fig. 5.

The pin 72 is now turned 180° bringing the flat surface 74 on the left and the arm 48 is rocked by the spring 70, the parts assuming the position shown in Fig. 7. The operator, having previously loosened the bolts 38, holds the arm 48 down with one hand, in the direction shown by the arrow c in Fig. 7, and with the other hand moves the plate 35 until he feels the striker 34 contact the flat face of the pin 45. While holding down at point c, the operator starts the press to open. While the press is opening and until the point P is reached, the arm 35 will turn clockwise by the press movement, whereupon the jump occurs and the relative movement of the toggle and the plate 35 will stop. He then stops the press. The springs 41 will hold the plate in its new position until the operator tightens the bolts 38. He then turns the pin 72 back to its normal position which restores the space between the striker and the feeler shown in Figs. 3 and 7. The above description demonstrates that it is a comparatively simple operation to set the safety mechanism so that it will function properly.

The modified form of the invention shown in Figs. 10 to 14 will now be described. While this embodiment of the invention operates just as satisfactorily as the embodiment shown in the earlier views, it is more difficult to set so that the feeler is accurately located with respect to the point P. It is, therefore, not as desirable for commercial purposes. In illustrating and describing this form of the invention, the same reference numerals are used for identical parts in both devices.

In this form the switch box is designated by the numeral 130. It comprises a main section 136 having vertical side walls 137 and a base 138 which is provided with slots 139 through which are passed the bolts 140 which secure the box on the pad 31, a clamp plate 141 being located beneath the heads of the bolts. This permits adjustment of the location of the switch box so that the switch operating arm or feeler can be set at the required point. It will be seen, however, that this mechanism is not provided with any gauge by which the location can be readily determined.

A removable cover 144 on the rear of the box permits access to the interior, and the top 145 is arched as shown to permit clearance of the upper toggle during the opening and closing movement. In the forward edges of the sidewalls 137 are the two oppositely positioned channels 149 in which is located the feeler carrying plate 150. A cover plate 152 is clamped to the forward edges of the walls 137 by bolts 153, the cover plate being enlarged sufficiently at the bolt passages so that the plate 150 is held in position between the parts 136 and 152.

The plate 150 is provided on its front face with a rib 155 to the lower end of which is attached the switch actuating member or feeler 158. This member is preferably made of a light spring metal strip, usually a phosphor bronze, and is secured at its lower end to the rib 155 by a clamp plate 159 and bolts 160. The upper end of the member 158 is reduced to a knife edge and extends above the upper surface of the switch box so that in normal operation the tip of the member lies just at the rear of the point P in the path S of the striker 34 and sufficiently below the extension of the path so that the striker will clear the feeler in the same manner as described with respect to the other embodiment of the invention. This is shown in Fig. 10.

Figures 10, 11, 12:
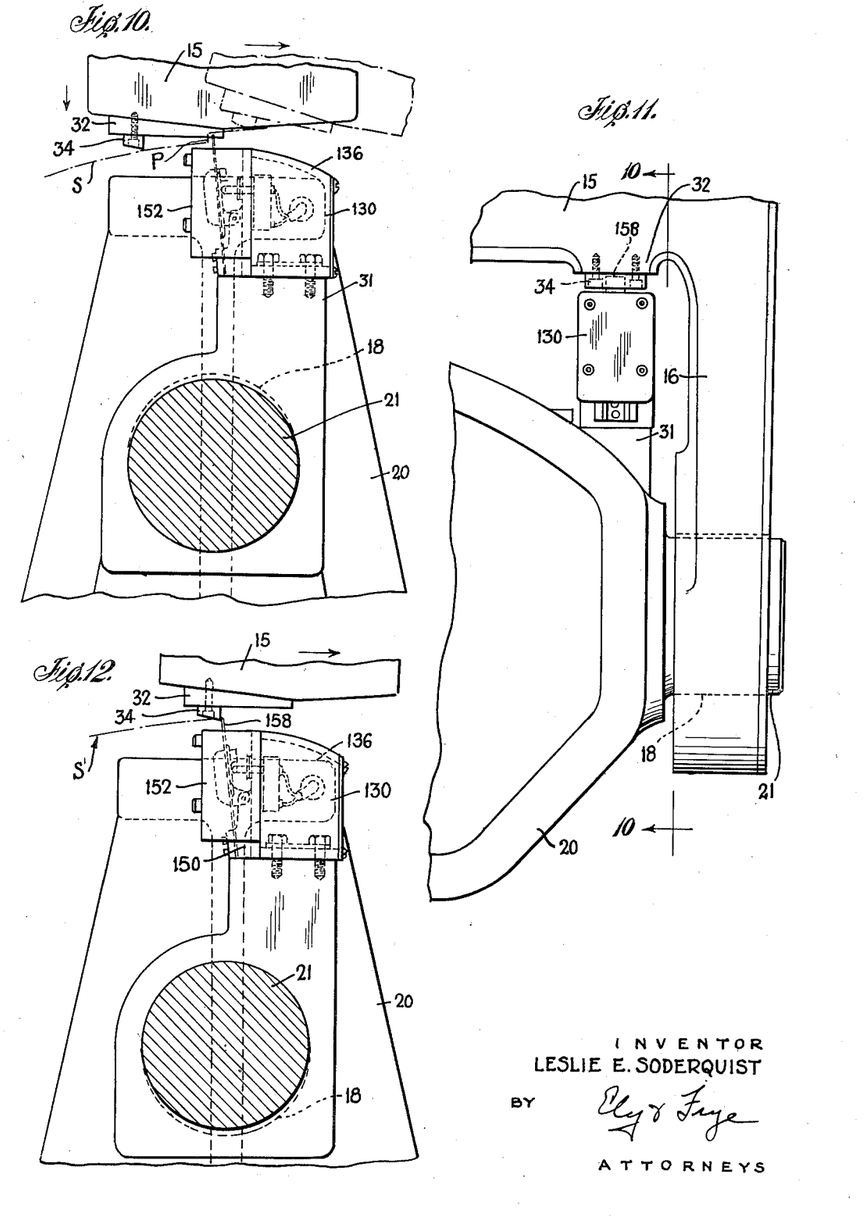
Fig. 10 is a side view of a modified form of control mechanism. This view is taken in the plane 10—10 of Fig. 11.
Fig. 11 is a side view thereof.
Fig. 12 is a view similar to Fig. 10 but showing the operation when conditions are abnormal.
Figure 13:
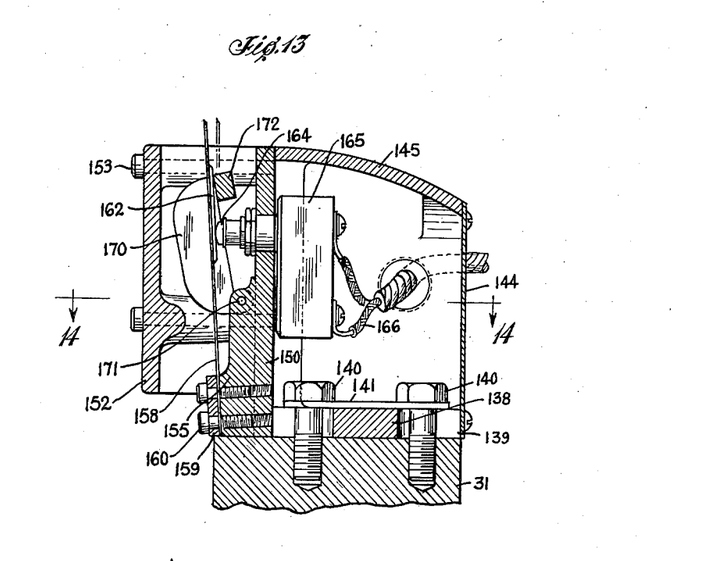
Fig. 13 is a vertical section through this modified control box.
Figure 14:
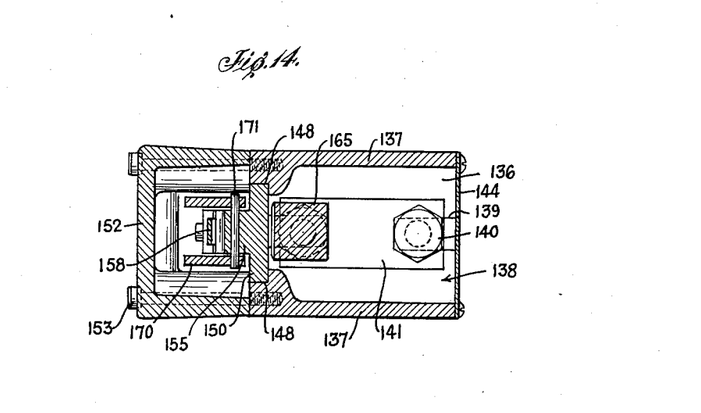
Fig. 14 is a horizontal section on the line 14—14 of Fig. 13.

When, however, the operation is abnormal the tip of the switch actuating member lies in the path of the striker as shown in Fig. 12.

The central portion of the feeler is embossed at 162 and resting against this portion of the feeler is the pushbutton 164 of a micro-switch 165 attached to the rear of the plate 150. The micro-switch is connected by leads 166 to the circuit breaker for the press motor.

In this form of the invention to provide against accidental operation of the switch on closing movement, due to causes stated, it is necessary to prevent the spring action of the feeler from causing a rebound which might throw the switch and stop the press.

To guard against such an accidental operation of the safety switch in this form of the invention, a pivoted counter-balance is provided for the feeler. In the form shown this is a bifurcated arm 170 which is pivoted at 171 to the plate 150 and is provided with a cross arm 172 which rests by gravity against the embossed portion 162 of the feeler and serves to dampen any rebound in the spring arm.

Resumé

It is not intended by any of the foregoing to limit the scope of the invention to any of the precise dimensions set forth. Either device has been found to give control of the press and to prevent opening thereof when the pressure within the mold is not safely evacuated at the time the press starts to open.

Briefly reviewing the operation of either type of safety mechanism, with particular reference to its use on tire presses:

If the bag is safely evacuated by the time the press is to open, the toggle will begin to rock to open the press and the striker will clear the tip of the feeler and the movement will continue in the normal course. This is because up to the point, P the movement of the toggle is only taking up the stresses in the press and the looseness in the bearing and no lifting of the mold has taken place. If, however, the air bag has not been evacuated, the upper mold section and platen will rise with the shaft 21 and there will be no such action as illustrated at the point P, instead the two elements of the safety couple will contact and the press brought to an immediate stop.

In either case the mechanism will not be injured in the event the mold does not close properly on the closing movement of the press. In either case also, the feeler may be set both in a vertical and horizontal plane so as to locate the working edge of the feeler at the exact point required for safe and efficient operation, but the form of the invention shown in Figs. 3 to 8 is superior in that respect.

In all cases the switch in the control box may be considered as a circuit breaker, although it merely actuates a conventional circuit breaker.

While the invention is shown and described in conjunction with the operation of vulcanizing presses, it is conceivable that it may be employed more widely.

What is claimed is:

1. A press for treating articles while under internal pressure, comprising a sectional mold for the article, a movable platen to which one of the mold sections is attached, a shaft on the platen, a link for raising and lowering the platen, said link having a bearing for the shaft, there being sufficient clearance at the shaft and bearing to permit a limited movement between the platen and the link, and a press control device located adjacent the bearing and actuated by the movement of the link at the beginning of the press opening movement to arrest the press movement when the internal pressure has not been released to allow relative movement between the shaft and the bearing before the link operates to lift the platen.

2. A press for treating articles while under internal pressure, comprising a sectional mold for the article, a moveable platen to which one of the mold sections is attached, a movable lever connected to the platen for raising and lowering it, a lost motion connection between the platen and the lever, a switch for controlling the operation of the press, and a striker for actuating said switch, said switch and striker being mounted adjacent the connection between the platen and lever and operable to clear each other if the pressure within the article is released to permit motion in said lost motion connection, but to engage if the pressure within the article is not released.

3. A press for the vulcanization of articles while under internal pressure comprising complementary mold sections, a movable platen to which one of said sections is attached, a toggle link pivotally connected to the platen for raising and lowering it, said pivotal connection having provision for a limited lost motion, a control device comprising a circuit breaker for arresting the opening movement of the press and a striker for actuating the circuit breaker, one of the elements of said control devices being located on the link and the other element on the platen in position so that if the pivotal connection is at one limit of its movement the elements of the control device will clear one another during opening of the press but will contact one another if said connection is at the other limit of its movement.

4. A motor-operated press for the vulcanization of articles while under internal pressure comprising complementary mold sections, a movable platen to which one of the sections is attached, a shaft on the platen, means to lift the platen comprising a swinging link having a bearing surrounding the shaft with sufficient clearance to permit limited movement of the shaft in the bearing, means to arrest the press operating motor, and means actuated by the movement of the link during opening movement of the press to actuate the arresting means if the shaft is in contact with the upper portion of its bearing.

5. A motor-operated press for the vulcanization of articles while under internal pressure comprising complementary mold sections, a movable platen to which one of the sections is attached, a shaft on the platen, means to lift the platen comprising a toggle link having a bearing surrounding the shaft with sufficient clearance to permit limited movement of the shaft in the bearing, a circuit breaker for the press operating motor, and a striker carried by the toggle link and movable over the circuit breaker during opening and closing movements of the press, said circuit breaker having an operating arm which extends into the path of the striker only when the shaft is in contact with the upper portion of its bearing.

6. A motor-operated press for the vulcanization of articles while under internal pressure comprising complementary mold sections, a movable platen to which one of the sections is attached, a shaft on the platen, means to lift the platen comprising a toggle link having a bearing surrounding the shaft with sufficient clearance to permit limited movement of the shaft in the bearing, a circuit breaker for the press operating motor, a striker carried by the toggle link and movable over the circuit breaker during the opening and closing movements of the press, said circuit breaker having an operating arm which extends into the path of the striker only when the shaft is in contact with the upper portion of its bearing, and means associated with the operating arm to prevent the operating arm from actuating the circuit breaker while the press is closing.

7. In a tire vulcanizing press for vulcanizing tires under internal pressure, a movable platen, a mold section attached to the platen, a swinging toggle link loosely pivoted to the platen so as to permit lost motion between the platen and the toggle link, mechanism to rock the toggle link to raise and lower the platen, means to stop the operation of the press, and a striker movable across said means to actuate said means if the pressure is not released from the tire, said lost motion permitting the striker to clear said means during opening movement of the press if the pressure is released from the tire.

8. In a tire vulcanizing press for vulcanizing tires under internal pressure, a movable platen, a mold section attached to the platen, a swinging toggle link loosely pivoted to the platen so as to permit lost motion between the platen and the toggle link, means to rock the toggle link to raise and lower the platen, a press arresting means located on the platen and operable to stop the press, and a striker carried by the toggle and movable in an arc over said arresting means, said lost motion permitting the striker to clear the arresting means during opening movement of the press if pressure is released from the tire but projecting the arresting means into the path of the striker if the pressure is not released.

9. In a motor-operated press for treating articles while under internal pressure, complementary mold sections, a platen to which one of the mold sections is attached, a lever pivotally connected to the platen with a limited degree of lost motion, said lever being adapted to lift the platen and its connected mold section, a circuit breaker for the press motor on the platen, and a striker attached to the lever and movable in an arc across the circuit breaker, said lost motion being sufficient to permit the striker to pass across the circuit breaker without contacting it before the lever will act to lift the platen if the internal pressure has been relieved.

10. A press having a movable upper platen and a lower platen, a link pivotally connected to the upper platen, means to move the link to raise the upper platen, said link and upper platen having a limited lost motion at the commencement of the raising motion, a safety device located adjacent the pivotal connection, said safety device including two elements which clear each other if the link acts to take up the lost motion but which contact if the lost motion is not taken up, and means to arrest the movement of the press operative upon contact of the said elements.

11. A press of the type set forth having upper and lower mold sections in which an article is treated while under internal pressure, a platen to which one of the mold sections is attached, a swinging link operative to raise the platen and having a pivotal connection with the platen, said pivotal connection having clearance providing for a limited lost motion before the platen is lifted, two elements forming a safety couple, one of said elements being mounted on the platen and the other on the link in position so that the elements clear one another in the event the pressure is relieved before the platen is raised but contact if the pressure is not relieved, and means to arrest the press actuated by the contact of the said elements.

12. A vulcanizing press having two separable mold sections, a platen to which one of the mold sections is attached, a swinging link pivotally connected to the platen and operable to raise the platen, said pivotal connection having provision for limited lost motion, a feeler on the platen, and a striker on the link, said striker and feeler being so positioned that the striker skips over the feeler during the swinging movement of the link if the lost motion is taken up before the striker reaches the feeler.

13. In a vulcanizing press, a vertically movable platen, a toggle link for moving the platen pivotally connected to the platen, said pivotal connection having a limited clearance, an arm carried by the toggle link, a striker carried by the arm, a safety switch operable to arrest the press movement carried by the platen, a feeler operatively associated with the switch and located in the path of the striker, and means to fix the arm on the toggle link in a position so that the striker will skip over the feeler at the point in the travel of the toggle link where the clearance is taken up before the platen rises.

14. In a vulcanizing press, a vertically movable platen, a toggle link for moving the platen pivotally connected to the platen, said pivotal connection having a limited clearance, an arm carried by the toggle link, a striker carried by the arm, a safety switch operable to arrest the press movement carried by the platen, a feeler operatively associated with the switch and located in the path of the striker, and an adjustable connection between the arm and the toggle link to permit the striker to be located so that it will skip over the feeler at the point in the travel of the toggle link where the clearance in the pivotal connection is taken up before the platen rises.

15. In a press for vulcanizing articles under internal pressure, a two part mold, a platen to which one of the mold parts is attached, a swinging toggle link having a loose pivotal connection with the platen, the lost motion within the pivotal connection being responsive to the degree of pressure within the article, a safety switch to arrest the opening movement of the press in the event the internal pressure is not first relieved, a feeler for actuating the switch carried by the platen and a striker for actuating the feeler carried by the toggle link, said feeler and striker being located so that the striker skips over the feeler if the pressure is relieved but strikes the feeler if the pressure is not relieved, and means for adjusting the position of both the feeler and the striker on their respective supports.

16. In a press for vulcanizing articles under internal pressure, a two part mold, a platen to which one of the mold parts is attached, a swinging toggle link having a loose pivotal connection with the platen, the lost motion within the pivotal connection being responsive to the degree of pressure within the article, a safety switch to arrest the opening movement of the press in the event the internal pressure is not first relieved, a feeler for actuating the switch and located on the platen, an adjustable stop for the feeler, a plate mounted for angular pivotal movement on the toggle, and a striker on the plate, said plate being shiftable so that the striker will contact the feeler when the latter is in one of its positions but pass over the feeler when it is in another position.

17. A vulcanizing press comprising a vertically movable platen and a swinging link pivotally connected to the platen with a limited clearance at the pivotal connection, said link acting to raise the platen after the clearance is taken up, a plate on the link, adjusting means for setting the plate at varying angular positions on the link, a striker on the plate, a safety switch for controlling the prime mover for the press mounted on the platen, a feeler for actuating the switch and projecting toward the path of the striker, and means for selectively locating the feeler so that it is either at the point occupied by the striker when the clearance is taken up or in advance of said point.

18. A vulcanizing press comprising a vertically movable platen and a swinging link pivotally connected to the platen with a limited clearance at the pivotal connection, said link acting to raise the platen after the clearance is taken up, a plate on the link, adjusting means for setting the plate at varying angular positions on the link, a striker on the plate, a safety switch mounted on the platen for controlling the movement of the press, a feeler for actuating the switch and projecting toward the path of the striker, a spring mounting for the feeler which permits it to rock when contacted by the striker moving in one direction or to depress when contacted by the striker moving in the opposite direction, and means for selectively locating the feeler so that it is either at the point occupied by the striker when the clearance is taken up or in advance of said point.

LESLIE E. SODERQUIST.

REFERENCES CITED

The following references are of record in the file of this patent:

UNITED STATES PATENTS

| Number | Name | Date |
| --- | --- | --- |
| 2,242,795 | Soderquist | May 20, 1941 |
| 2,392,619 | Soderquist | Jan. 8, 1946 |